V. W. BALZER AND J. McK. BALLOU.
MECHANICAL MOVEMENT.
APPLICATION FILED NOV. 4, 1920.
1,372,331.
Patented Mar. 22, 1921.
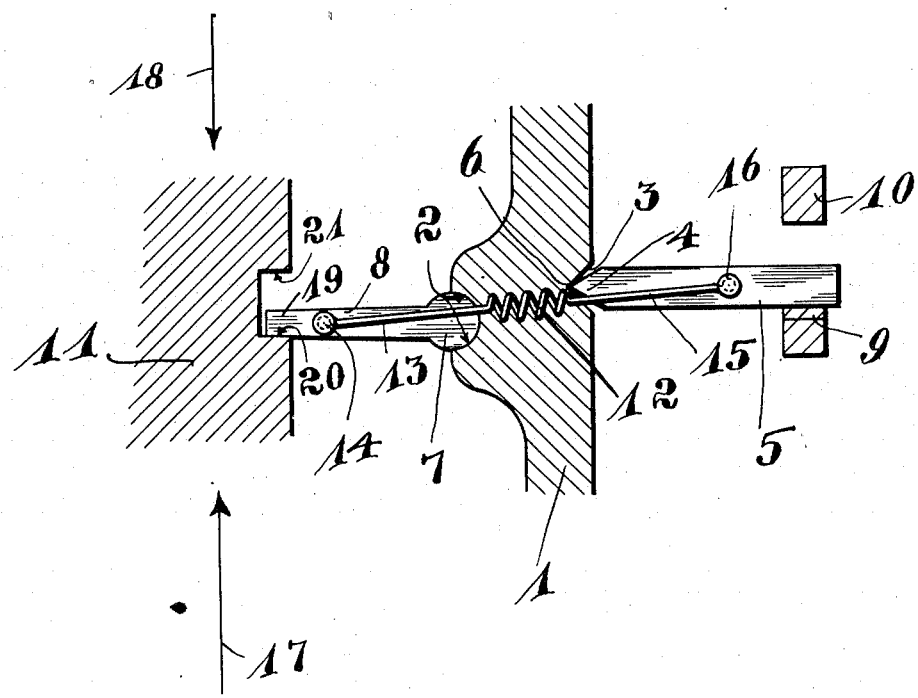
INVENTORS:
VERNON W. BALZER,
JOHN McK. BALLOU,
their Atty.

UNITED STATES PATENT OFFICE.

VERNON W. BALZER AND JOHN McK. BALLOU, OF LOS ANGELES, CALIFORNIA.

MECHANICAL MOVEMENT.

1,372,331.  Specification of Letters Patent.  Patented Mar. 22, 1921.

Application filed November 4, 1920. Serial No. 421,736.

*To all whom it may concern:*

Be it known that we, VERNON W. BALZER and JOHN McK. BALLOU, citizens of the United States, residing at Los Angeles, in the county of Los Angeles and State of California, have invented a new and useful Mechanical Movement, of which the following is a specification.

This invention relates to devices for transmitting the movement of one member to a second member.

One of the objects of this invention is to vary the time of occurrence and length of the movement of the second member in the relation to the movement of the first member.

Another object is to eliminate the vibrating motions in the movements of the second member by steadying the movement of the first member.

Another object is to mount one member for a rocking and swinging motion on one edge of the member so as to easily and quickly move from one side or position to the other; and mounting a second member for a rocking and swinging motion, rested and seating on more than just an edge, providing friction means in and on the seating and resting surface so as to retard and steady the rocking and swinging motions of this second member.

Another object is to provide interengaging means between such two members so as to transform the retarded and slow motion of the one member into a quick and sudden motion in the other member.

Other objects will appear from the following description and appended claims as well as from the accompanying drawing, in which—

The figure is an illustration of two members, each engaging and mounted with one end on the same stationary member, and each having a free end adapted to freely swing and rock back and forth, a spring interconnecting the two rocking members, a movable member for actuating the one rocking member, and stops or contacts for the second rocking member.

The stationary member 1 is preferably provided with the two rests or seats 2 and 3. The seat 2 is preferably formed as a portion of a cylindrical recess. The seat 3 is preferably formed as a recess of wider proportion than the end 4 of the rocking member 5. The end 4 of the rocking member 5 is preferably made of a sharp-edged wedge-shape, the sharp edge 6 engaging and seating in the bottom of the seat 3 so that the rocking member 5 will easily and quickly move from one side to the other when so actuated. The end 7 of the rocking member 8 is preferably made of a practically cylindrical shape to evenly and slidingly engage with the seat 2. Such sliding engagement of a proportionally large surface between the rocking member 8 and the stationary member 1 naturally produces more friction than the engagement of the edge end 4 of the rocking member 5 when actuated for a rocking movement. The stops 9 and 10 are provided to control the rocking movement of the rocking member 5. The movable member 11 is provided to actuate the rocking member 8. The spring 12 is provided as an interactuating member between the two rocking members 5 and 8. The spring end 13 engages at 14 with the rocking member 8. The spring end 15 engages at 16 with the rocking member 5. The spring is illustrated rather short while the ends 13 and 15 are illustrated proportionally rather long, this is mainly done for the purpose of making the illustration really clear, the long ends 13 and 15, going over the interengaging points between the rocking members and the stationary member, naturally emphasize the fact that the center line of the spring 12 passes sidewise of the central seating points of the rocking arms or members in relation to the stationary member 1.

It is stated above that an edge and a cylindrical shape is preferred in the ends 4 and 7 of the rocking members 5 and 8, but it will easily be understood that a pointed end of the member 5 and a ball end for the member 8 would give the same result, namely retarding the movement of the member 8 while providing for an easy and a quick movement of the member 5. The principle is to provide a larger bearing and seating surface for the end of the one rocking member while providing a proportionally much smaller bearing and seating surface for the end of the other rocking member, for purposes and reasons that will easily be obvious from the description hereafter.

The movable member 11 is normally operating in the direction of the arrows 17 and 18.

To emphasize the fact of the friction between the end 7 of the rocking member 8 and the stationary member 1, and to explain the effect of such friction, the end 19 of the rocking member 8 is illustrated as still resting and engaging with the shoulder 20 of the movable member 11, though it otherwise would appear that the end 19 of the rocking member 8 really ought to snap toward the shoulder 21 of the movable member 11 since the center of the spring 12 is illustrated on that side of the center of the support or engaging point in the end 7 of the rocking member 8.

The friction and location and action of the rocking member is designed so that the movable member can travel and move quite a distance before the friction between the rocking member and the stationary member is overcome by the strength or tension of the spring to such an extent as to cause the snapping of the rocking member toward the shoulder 21 of the movable member 11.

The location of the rocking member 8 in relation to the location of the rocking member 5 is arranged in such a manner as to bring the center of the spring not past the center of the support in the end 4 of the rocking member 5 before the snapping (or moving to such an extent) of the rocking member 8. Such a moving to such extent that the spring will come past the center of the end 4 of the rocking member 5, intensified by such snapping or the suddenly quicker movement of the rocking member 8 naturally produces and causes a sudden and quick snapping of the rocking member 5.

The reversed movement of the movable member 11 in the direction of the arrow 18, naturally causes a similar movement of the rocking members 5 and 8 in a reversed manner in relation to the movements described above.

Having thus described our invention, we claim:

1. In a mechanical movement, a stationary member having recesses in two opposite faces, two rocking members mounted for a rocking movement in the recesses of the stationary member projecting away from the stationary member, the rocking and bearing end of one member having proportionally larger bearing surface than the other, and means between the rocking members for actuating one member through the actions of the other rocking member.

2. In a mechanical movement, a stationary member having recesses in two opposite faces, one rocking member having a sharp-edged termination seating in one of the recesses in the stationary member and projecting away from the stationary member, a second rocking member having a rounded termination swingably seating in the second recess of the stationary member, projecting away from the stationary member in the opposite direction in relation to the first-named rocking member, the first-named rocking member engaging only with its very edge with the stationary member while the second-named rocking member is swingably incased in the corresponding recess so that this recess engages over a large portion of the rounded termination, and means between the two rocking members for actuating the one member through the movements of the other.

In testimony that we claim the foregoing as our invention we have signed our names in the presence of two subscribing witnesses.

VERNON W. BALZER.
JOHN McK. BALLOU.

Witnesses:
Ivan L. Shogran,
G. V. Davidson.